US012680492B2

(12) United States Patent
Sakaida

(10) Patent No.: US 12,680,492 B2
(45) Date of Patent: Jul. 14, 2026

(54) EXHAUST COMPONENT

(71) Applicant: Futaba Industrial Co., Ltd., Okazaki (JP)

(72) Inventor: Ryuji Sakaida, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 105 days.

(21) Appl. No.: 18/930,058

(22) Filed: Oct. 29, 2024

(65) Prior Publication Data

US 2025/0146434 A1 May 8, 2025

(30) Foreign Application Priority Data

Nov. 7, 2023 (JP) ................................ 2023-190209

(51) Int. Cl.
*F01N 13/00* (2010.01)
*F01N 3/035* (2006.01)
(Continued)

(52) U.S. Cl.
CPC ........... *F01N 13/008* (2013.01); *F02M 26/14* (2016.02); *F01N 3/035* (2013.01); *F01N 3/10* (2013.01);
(Continued)

(58) Field of Classification Search
CPC .......... F01N 3/035; F01N 3/10; F01N 11/002; F01N 13/008; F01N 2250/02; F01N 2470/20; F01N 2560/08; F02M 26/14
(Continued)

(56) References Cited

U.S. PATENT DOCUMENTS 5,293,743 A * 3/1994 Usleman ................ F01N 13/14 60/299
5,419,127 A * 5/1995 Moore, III ........... F01N 13/102 60/322
(Continued)

FOREIGN PATENT DOCUMENTS

JP H11287588 A 10/1999
JP 2000107870 A 4/2000
(Continued)

OTHER PUBLICATIONS

Notice of Reasons for Refusal for Japanese Patent Application No. 2023-190209 mailed Sep. 24, 2025, 8 pages.

*Primary Examiner* — Patrick D Maines
(74) *Attorney, Agent, or Firm* — Withrow + Terranova, PLLC; Vincent K. Gustafson

(57) ABSTRACT

An exhaust component includes a first member and a second member. The first member forms a first flow path for exhaust gas. The second member forms a second flow path that has a smaller cross-sectional area than the first flow path. The first member includes a hole-forming portion forming a through hole. The hole-forming portion includes an edge portion, the edge portion protruding toward an outside of the first member in a manner curved from a periphery of the through hole, the edge portion surrounding the through hole. The second member includes an upstream end portion located on an upstream side of the second flow path, the upstream end portion being joined to the hole-forming portion to cover an outer-peripheral surface of the hole-forming portion. The second flow path is for the exhaust gas that has passed through the through hole and flowed in from the upstream end portion.

5 Claims, 2 Drawing Sheets

(51) Int. Cl.
*F01N 3/10* (2006.01)
*F01N 11/00* (2006.01)
*F02M 26/14* (2016.01)

(52) U.S. Cl.
CPC ......... *F01N 11/002* (2013.01); *F01N 2250/02* (2013.01); *F01N 2470/20* (2013.01); *F01N 2560/08* (2013.01)

(58) Field of Classification Search
USPC ........................... 60/277, 278, 297, 299, 311
See application file for complete search history.

(56) References Cited

U.S. PATENT DOCUMENTS

| | | | | |
|---|---|---|---|---|
| 2015/0059324 | A1* | 3/2015 | Grussmann | F01N 13/185 60/323 |
| 2018/0320570 | A1* | 11/2018 | Car | F01N 13/008 |
| 2019/0078977 | A1* | 3/2019 | Carremm | F01N 13/008 |

FOREIGN PATENT DOCUMENTS

| | | | | | |
|---|---|---|---|---|---|
| JP | 2005083365 | A | * | 3/2005 | F02M 26/14 |
| JP | 2005106014 | A | * | 4/2005 | |
| JP | 2006291909 | A | | 10/2006 | |
| JP | 2007023996 | A | * | 2/2007 | F01N 9/002 |
| JP | 2012047037 | A | | 3/2012 | |
| JP | 2013142372 | A | * | 7/2013 | |
| JP | 2014070530 | A | * | 4/2014 | |
| JP | 2015092066 | A | | 5/2015 | |
| JP | 7128140 | B2 | * | 8/2022 | |

* cited by examiner

EXHAUST COMPONENT

CROSS-REFERENCE TO RELATED APPLICATIONS

This application claims the benefit of Japanese Patent Application No. 2023-190209 filed on Nov. 7, 2023 with the Japan Patent Office, the entire disclosure of which is incorporated herein by reference.

BACKGROUND

The present disclosure relates to an exhaust component.

There is a known technique for extracting exhaust gas from a flow path along which the exhaust gas generated in an internal combustion engine flows. Japanese Unexamined Patent Application Publication No. 2015-092066 discloses the technique of recirculating the exhaust gas extracted from a case through an Exhaust Gas Recirculation (EGR) pipe to the internal combustion engine. The case forms an exhaust gas flow path. The EGR pipe is inserted into a hole in the case.

SUMMARY

In most cases, an exhaust system of the internal combustion engine includes a catalyst that has a filtering function of capturing exhaust particles contained in the exhaust gas. This catalyst filter is clogged with use. For this reason, a detection is performed to find a clogging in the filter. The clogging in the filter can be detected by, for example, extracting the exhaust gas from the exhaust gas flow path and then measuring a pressure of the exhaust gas. In conventional art, the case forming the exhaust gas flow path is provided with a hole. An end of the pipe is inserted into the hole. An inner diameter of the pipe is significantly smaller relative to a diameter of the exhaust gas flow path inside the case. This increases a pressure loss of the exhaust gas (specifically, an inlet pressure loss at an inlet of the pipe) when the exhaust gas is extracted from the case to the pipe.

In one aspect of the present disclosure, it is desirable to reduce the pressure loss of the exhaust gas.

One aspect of the present disclosure is an exhaust component comprising a first member and a second member. The first member forms a first flow path for exhaust gas. The second member forms a second flow path, which has a smaller cross-sectional area than the first flow path. The first member includes a hole-forming portion forming a through hole.

The hole-forming portion includes an edge portion, the edge portion protruding toward an outside of the first member in a manner curved from a periphery of the through hole, the edge portion surrounding the through hole.

The second member includes an upstream end portion located on an upstream side of the second flow path, the upstream end portion being joined to the hole-forming portion so as to cover an outer-peripheral surface of the hole-forming portion. The second flow path is a flow path for the exhaust gas that has passed through the through hole and flowed in from the upstream end portion.

This configuration makes it possible to reduce the pressure loss of the exhaust gas.

In one aspect of the present disclosure, an end face of the upstream end portion may be formed such that an angle formed with the outer-peripheral surface of the hole-forming portion is an obtuse angle.

This configuration makes it possible to improve joint stability when the upstream end portion of the second member is joined to the hole-forming portion of the first member.

In one aspect of the present disclosure, an inner-peripheral surface of the upstream end portion may be formed so as to expand radially outward from a downstream side toward the upstream side of the second flow path.

This configuration makes it possible to improve an accuracy of joining the upstream end portion of the second member to the hole-forming portion of the first member.

In one aspect of the present disclosure, the hole-forming portion may be curved toward the outside of the first member at an angle greater than 0 degrees and less than or equal to 90 degrees.

This configuration makes it easier to process the second member to be joined to the hole-forming portion of the first member.

In one aspect of the present disclosure, the first member may be formed as a case including a catalyst therein, and the second member may be formed as a pipe to be connected to a sensor or an exhaust gas recirculation (EGR) pipe.

This configuration makes it possible to reduce the pressure loss of the exhaust gas in a device where the EGR pipe or the pipe for the sensor is to be attached to the case for the catalyst.

BRIEF DESCRIPTION OF THE DRAWINGS

Example embodiments of the present disclosure will be described hereinafter by way of example with reference to the accompanying drawings, in which.

DETAILED DESCRIPTION OF EXEMPLARY EMBODIMENTS

Embodiments of the present disclosure are not limited to the embodiments described below, and may take various forms as long as they belong to the technical scope of the present disclosure.

1. First Embodiment

[1-1. Configuration]

[1-1-1. Overall Configuration]

Figure 1:
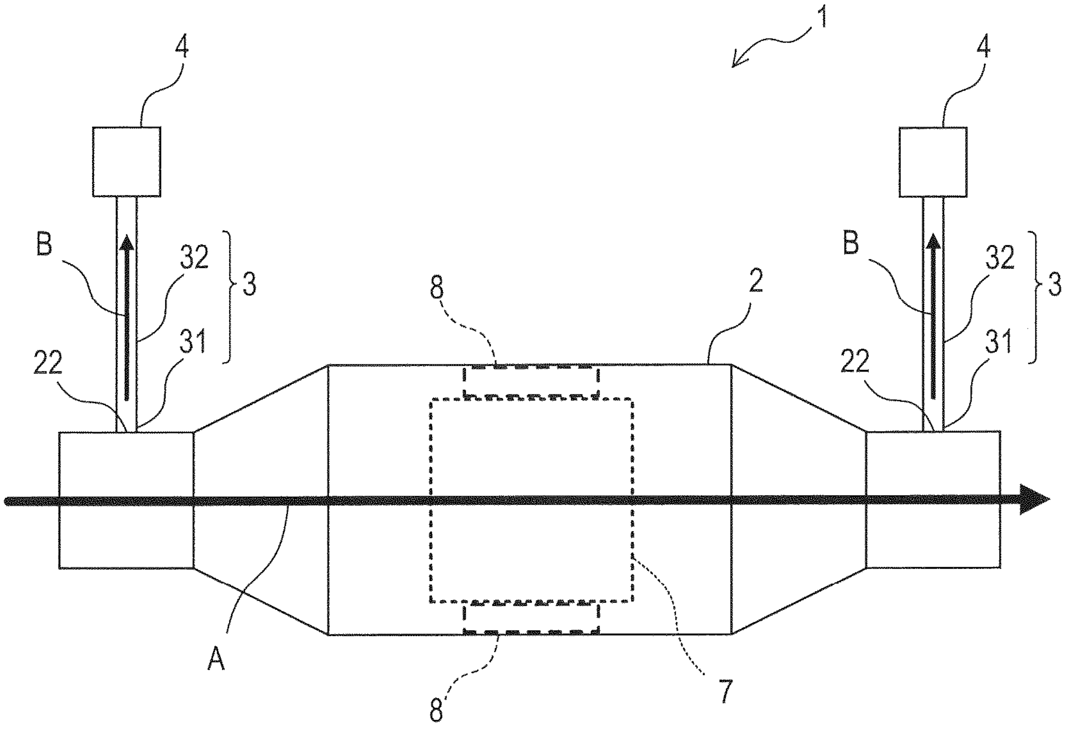
FIG. 1 is a schematic diagram of an exhaust component.

An exhaust component 1 shown in FIG. 1 is mounted in a vehicle such as an automobile. The exhaust component 1 forms at least a part of a flow path for exhaust gas generated in an internal combustion engine of the vehicle. In the present embodiment, the exhaust component 1 is a catalytic converter.

The exhaust component 1 includes a case 2, a pipe 3, and a pressure sensor 4.

The case 2 forms a first flow path A therein, which is an exhaust gas flow path. The case 2 includes a catalyst 7 and a supporting mat 8. In FIG. 1, the catalyst 7 and the supporting mat 8, which are arranged inside the case 2, are represented with broken lines.

The catalyst 7 is arranged on the first flow path A inside the case 2. The catalyst 7 has a filtering function of capturing exhaust particles. The exhaust gas flowing along the first flow path A is purified by passing through the catalyst 7.

The supporting mat 8 is arranged to fill in a gap between an inner surface of the case 2 and the catalyst 7. The supporting mat 8 supports the catalyst 7.

The pipe 3 is a tubular member forming a second flow path B therein, which is a flow path having a smaller cross-sectional area than the first flow path A. An outer diameter of the pipe 3 ranges, for example, from a few millimeters to a few centimeters. The pipe 3 includes an upstream end portion 31 and a body 32. The upstream end portion 31 is an end portion of the pipe 3 on an upstream side of the second flow path B. The body 32 is a portion adjacent to the upstream end portion 31 and extending along the second flow path B. The body 32 is a portion that substantially forms the second flow path B in the pipe 3.

The upstream end portion 31 is arranged such that the second flow path B is continuous with the first flow path A through a through hole 22 provided on a side surface 21 of the case 2. Specifically, the exhaust gas that flows along the first flow path A of the case 2 at least partially diverges from the first flow path A, passes through the through hole 22, and flows from the upstream end portion 31 of the pipe 3 to the second flow path B. The pipe 3 is connected to the pressure sensor 4.

The pressure sensor 4 is a sensor that measures pressure of the exhaust gas that flows along the second flow path B in the pipe 3.

In the case 2, the through hole 22 is arranged on an upstream side and a downstream side of the first flow path A, relative to the catalyst 7. The pipe 3 and the pressure sensor 4 are provided to the through hole 22 arranged on the upstream side and the downstream side.

By using the pressure sensors 4 on the upstream side and the downstream side, it is possible to measure a pressure difference between the exhaust gas that has flowed in from the upstream side of the first flow path A to the corresponding second flow path B, and the exhaust gas that has flowed in from the downstream side of the first flow path A to the corresponding second flow path B. Generally, in the first flow path A, a pressure of the exhaust gas on the upstream side relative to the catalyst 7 is greater than a pressure of the exhaust gas on the downstream side relative to the catalyst 7. The greater the pressure difference in the exhaust gases, the filter of the catalyst 7 can be assumed to be clogged.

For example, the exhaust system of the vehicle is configured to burn, on the filter of the catalyst 7, unburned fuel provided in the vehicle, if the pressure difference in the exhaust gases exceeds a specific value. With this combustion, the exhaust system removes the exhaust particles and clears the clogging in the filter of the catalyst 7.

[1-1-2. Configurations of Hole-Forming Portion and Upstream End Portion]

Figure 2:
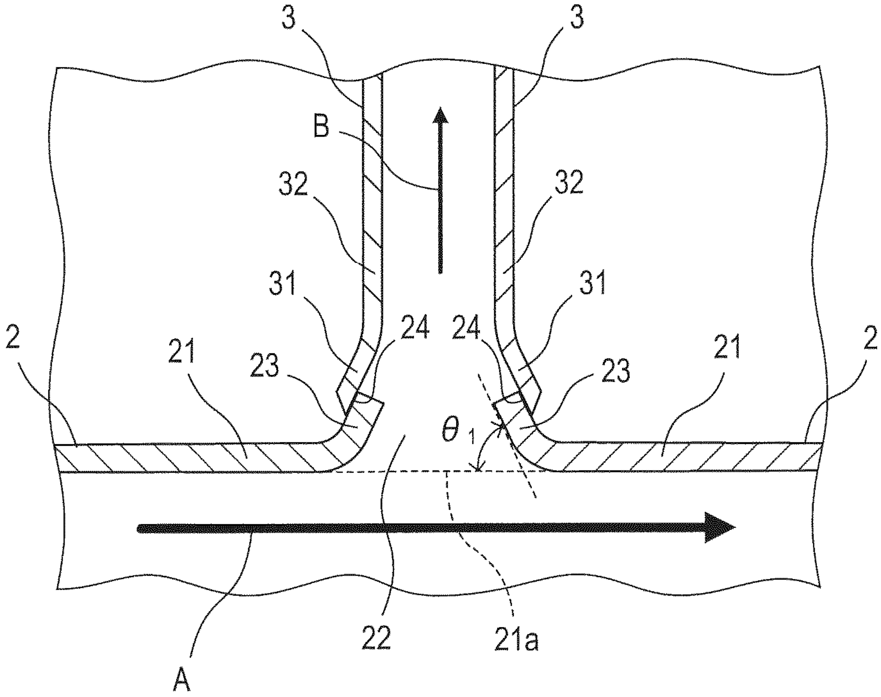
FIG. 2 is a sectional view of an area where a case and a pipe are joined together in the exhaust component according to a first embodiment.

As shown in FIG. 2, the case 2 includes a hole-forming portion 23, which forms the through hole 22 on the side surface 21.

An edge portion of the hole-forming portion 23 protrudes toward an outside of the case 2 in a manner curved from a periphery of the through hole 22. The edge portion of the hole-forming portion 23 surrounds the through hole 22. The hole-forming portion 23 is curved at an angle θ1 toward the outside of the case 2 from a hypothetical plane 21*a*, which is, in the through hole 22, positioned substantially on the same plane as that on which part of the side surface 21 adjacent to the hole-forming portion 23 is located. In other words, the angle θ1 is an angle formed between a direction in which the part of the side surface 21 of the case 2 adjacent to the hole-forming portion 23 extends and a direction in which the hole-forming portion 23 protrudes. In the present embodiment, the angle θ1 is greater than 0 degrees and less than 90 degrees. One example of methods of forming the hole-forming portion 23 is burring. The hole-forming portion 23 is formed such that a diameter of the through hole 22 on the hypothetical plane 21*a* is greater than a diameter of the body 32 of the pipe 3. Instead of burring, the hole-forming portion 23 may be formed by fixing, to the case 2, a ring-shaped separate member that could surround the through hole 22 of the case 2, by welding.

The upstream end portion 31 of the pipe 3 is joined to the hole-forming portion 23 so as to cover an outer-peripheral surface 24 of the hole-forming portion 23. Examples of the joining include welding or bonding. The joining fills in a gap between an inner-peripheral surface of the upstream end portion 31 and the outer-peripheral surface 24 of the hole-forming portion 23.

The upstream end portion 31 is curved outward in a radial direction of the pipe 3 at a portion where the upstream end portion 31 is adjacent to the body 32. The inner-peripheral surface of the upstream end portion 31 is formed so as to expand radially outward from a downstream side toward an upstream side of the second flow path B. More specifically, the inner-peripheral surface of the upstream end portion 31 is formed such that cross-sectional areas of the second flow path B formed by the upstream end portion 31 increase continuously or discontinuously relative to a cross-sectional area of the second flow path B formed by the body 32. One example of methods of forming the upstream end portion 31 is flaring. The inner-peripheral surface of the upstream end portion 31 may have a reverse-tapered or stepped shape. At least part of the inner-peripheral surface of the upstream end portion 31 abuts the outer-peripheral surface 24 of the hole-forming portion 23.

Figure 3:
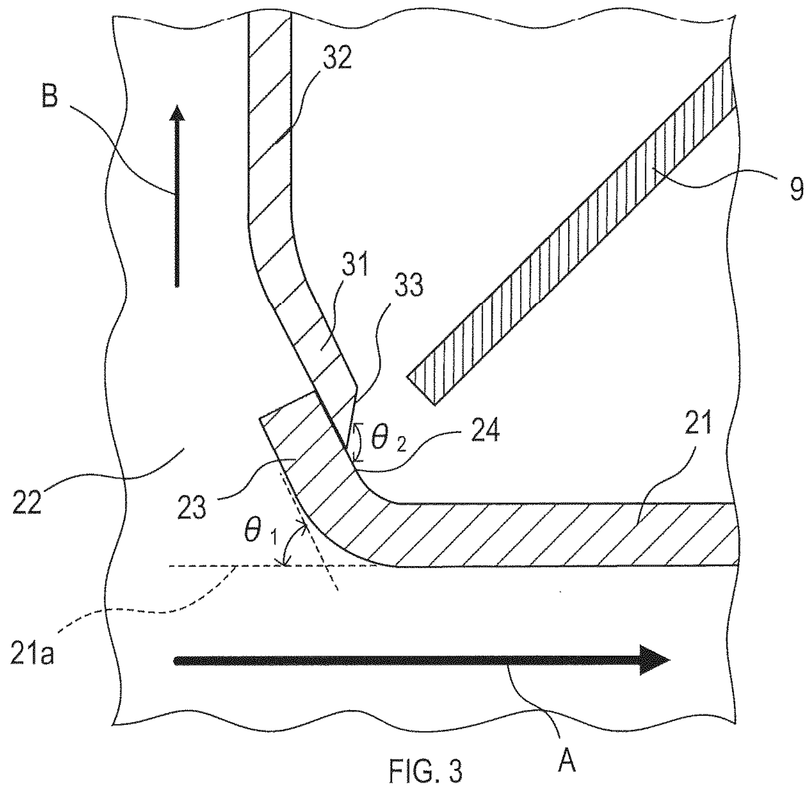
FIG. 3 is a sectional view showing a state in which the case and the pipe are joined together in the exhaust component according to the first embodiment.

As shown in FIG. 3, an end face 33 of the upstream end portion 31 is formed such that an angle θ2 formed with the outer-peripheral surface 24 of the hole-forming portion 23 is an obtuse angle. One example of methods of forming the end face 33 is beveling.

[1-2. Actions, Effects]

According to the embodiment detailed above, it is possible to obtain actions and effects as described below.

(1a) The edge portion of the hole-forming portion 23 of the case 2 protrudes toward the outside of the case 2 in a manner curved from the periphery of the through hole 22. The edge portion of the hole-forming portion 23 surrounds the through hole 22. The upstream end portion 31 of the pipe 3 is joined to the hole-forming portion 23 so as to cover the outer-peripheral surface 24 of the hole-forming portion 23. The exhaust gas that flows along the first flow path A of the case 2 at least partially diverges from the first flow path A, passes through the through hole 22, and flows from the upstream end portion 31 of the pipe 3 to the second flow path B.

According to this configuration, the diameters of the exhaust gas flow paths gradually decrease while the exhaust gas flows from the first flow path A to the second flow path B. Thus, the pressure loss of the exhaust gas is smaller compared to a case in which a curved portion of the hole-forming portion 23 is, instead of being curved, sharply bent to have an angle. The pressure loss of the exhaust gas is smaller compared to a case in which the upstream end portion 31 is inserted into the through hole 22 and also the upstream end portion 31 is not curved. For this reason, it is possible to reduce the pressure loss of the exhaust gas. More specifically, it is possible to guide partially the exhaust gas that flows along the first flow path A to the second flow path B in a state where a turbulent flow is difficult to occur.

In addition, in a process of joining the upstream end portion 31 and the hole-forming portion 23 together at the time of manufacture, the hole-forming portion 23 that protrudes toward the outside of the case 2 makes it easier to position the upstream end portion 31 when the upstream end portion 31 is joined to the hole-forming portion 23. This makes it possible to improve an accuracy of joining the upstream end portion 31 and the hole-forming portion 23 together.

(1b) The end face 33 of the upstream end portion 31 is formed such that the angle θ2 formed with the outer-peripheral surface 24 of the hole-forming portion 23 is the obtuse angle.

According to this configuration, in the process of joining the upstream end portion 31 and the hole-forming portion 23 together at the time of manufacture, when, for example, fillet-welding is performed to weld the end face 33 and the outer-peripheral surface 24 together, welding becomes easier. More specifically, as shown in FIG. 3, it is possible to easily apply a tip of a welding wire 9 to a part to be welded in the end face 33 and the outer-peripheral surface 24, compared to a case in which the end face 33 and the outer-peripheral surface 24 intersect at right angles (in other words, in a case that the angle θ2 is a right angle). This makes it possible to improve joint stability.

(1c) The upstream end portion 31 is curved outward in the radial direction of the pipe 3 at the portion where the upstream end portion 31 is adjacent to the body 32. The inner-peripheral surface of the upstream end portion 31 is formed so as to expand radially outward from the downstream side toward the upstream side of the second flow path B.

This configuration makes it easier to position the upstream end portion 31 when the upstream end portion 31 is joined to the hole-forming portion 23. This makes it possible to improve the accuracy of joining the upstream end portion 31 and the hole-forming portion 23 together.

In addition, when the upstream end portion 31 and the hole-forming portion 23 are welded together at the time of manufacture, weld beads occur on an inner-peripheral surface of the upstream end portion 31 or hole-forming portion 23, that is, on a reverse side of the welded part. On this point, in the present configuration, it is possible to inhibit the exhaust gas flow path from being narrowed or blocked as a result of welding.

(1d) The hole-forming portion 23 is formed such that the diameter of the through hole 22 on the hypothetical plane 21*a* is greater than the diameter of the body 32 of the pipe 3. The angle θ1 is an angle formed between a direction in which the part of the side surface 21 of the case 2 adjacent to the hole-forming portion 23 extends and a direction in which the hole-forming portion 23 protrudes. The angle θ1 is greater than 0 degrees and less than 90 degrees.

This configuration makes it easier to position the upstream end portion 31 when the upstream end portion 31 is joined to the hole-forming portion 23. This makes it easier to process the upstream end portion 31.

In addition, compared to a case in which the angle θ1 is 90 degrees or greater, it is easier to process the upstream end portion 31 of the pipe 3 such that the upstream end portion 31 covers the outer-peripheral surface 24 of the hole-forming portion 23, which forms the through hole 22.

(1e) The upstream end portion 31 of the pipe 3 is joined to the hole-forming portion 23 so as to cover the outer-peripheral surface 24 of the hole-forming portion 23.

According to this configuration, the pipe 3 is not located inside the case 2. This makes it possible to inhibit the pipe 3 from disturbing a flow of the exhaust gas in the first flow path A inside the case 2.

[1-3. Correspondence Relationship of Terms]

In the above-described embodiment, the case 2 corresponds to one example of the first member, and the pipe 3 corresponds to one example of the second member.

2. Other Embodiments

The embodiment of the present disclosure has been described so far. However, needless to say, the present disclosure is not limited to the above-described embodiment and may take various forms.

(2a) In the above-described embodiment, the pipe 3 is connected to the pressure sensor 4. However, the pipe 3 may be connected not only to the pressure sensor 4, but also to various other sensors. For example, the pipe 3 may be connected to sensors such as a temperature sensor or a nitrogen oxide (NOx) sensor. The pipe 3 does not necessarily have to be connected to a sensor.

(2b) In the above-described embodiment, the angle θ1 is greater than 0 degrees and less than 90 degrees. However, the angle θ1 may be 90 degrees or greater.

Figure 4:
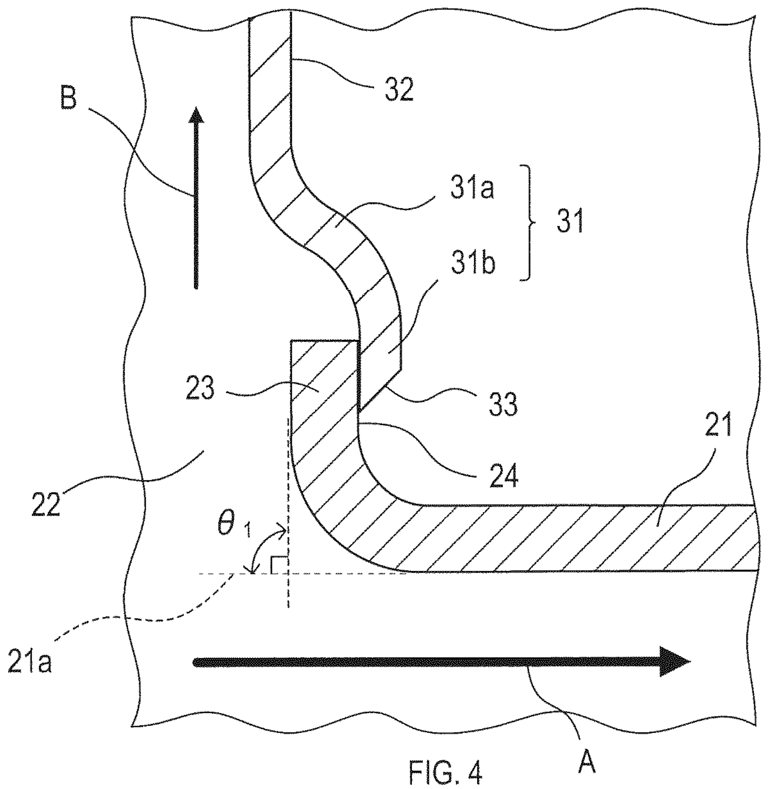
FIG. 4 is a sectional view showing a state in which the case and the pipe are joined together in the exhaust component according to another embodiment.

For example, as shown in FIG. 4, when the angle θ1 is 90 degrees, the upstream end portion 31 of the pipe 3 may include a diameter-increasing portion 31*a* and a leading end portion 31*b*. The diameter-increasing portion 31*a* has a diameter that expands from the downstream side toward the upstream side of the second flow path B. The leading end portion 31*b* is located in the upstream side of the second flow path B, relative to the diameter-increasing portion 31*a*. The leading end portion 31*b* may extend substantially perpendicular to the hypothetical plane 21*a*. Specifically, the leading end portion 31*b* may be substantially parallel to the direction in which the hole-forming portion 23 protrudes. The leading end portion 31*b* is joined to the hole-forming portion 23 so as to cover the outer-peripheral surface 24 of the hole-forming portion 23. The joining fills in a gap between an inner-peripheral surface of the leading end portion 31*b* and the outer-peripheral surface 24 of the hole-forming portion 23.

This configuration makes it easier to position the upstream end portion 31 when the upstream end portion 31 is joined to the hole-forming portion 23. This makes it possible to process the upstream end portion 31.

(2c) In the above-described embodiment, the exhaust component 1 is the catalytic converter. However, the exhaust component 1 is not limited to the catalytic converter; it only needs to be a component, a device, or the like that includes a portion that extracts the exhaust gas from the exhaust gas flow path. For example, the exhaust component 1 may be an exhaust gas recirculation (EGR) device. The pipe 3 may be an EGR pipe that recirculates the exhaust gas purified by the catalyst 7 to the internal combustion engine.

(2d) Two or more functions of a single element in the above-described embodiments may be achieved by two or more elements or a single function of a single element may be achieved by two or more elements. The functions of two or more elements may be achieved by a single element or a single function of two or more elements may be achieved by a single element. Part of the configuration in the above-described embodiments may be omitted. Furthermore, at least part of the configuration of the above-described embodiments may be added to or replaced by a configuration of other embodiments.

Technical Idea Disclosed in Present Invention

Item 1

An exhaust component comprising:

a first member forming a first flow path, the first flow path being a flow path for exhaust gas; and a second member forming a second flow path, the second flow path having a smaller cross-sectional area than the first flow path, the first member including a hole-forming portion forming a through hole, the hole-forming portion including an edge portion, the edge portion protruding toward an outside of the first member in a manner curved from a periphery of the through hole, the edge portion surrounding the through hole, the second member including an upstream end portion located on an upstream side of the second flow path, the upstream end portion being joined to the hole-forming portion so as to cover an outer-peripheral surface of the hole-forming portion, and the second flow path being a flow path for the exhaust gas that has passed through the through hole and flowed in from the upstream end portion.

Item 2

The exhaust component according to item 1, wherein an end face of the upstream end portion is formed such that an angle formed with the outer-peripheral surface of the hole-forming portion is an obtuse angle.

Item 3

The exhaust component according to item 1 or 2, wherein an inner-peripheral surface of the upstream end portion is formed so as to expand radially outward from a downstream side toward the upstream side of the second flow path.

Item 4

The exhaust component according to any one of items 1 through 3, wherein the hole-forming portion is curved toward the outside of the first member at an angle greater than 0 degrees and less than or equal to 90 degrees.

Item 5

The exhaust component according to any one of items 1 through 4, wherein the first member is formed as a case including a catalyst therein, and wherein the second member is formed as a pipe to be connected to a sensor or an exhaust gas recirculation (EGR) pipe.

What is claimed is:

1. An exhaust component comprising:

a first member forming a first flow path for exhaust gas; and a second member forming a second flow path, the second flow path having a smaller cross-sectional area than the first flow path, the first member including a hole-forming portion forming a through hole, the hole-forming portion including an edge portion, the edge portion protruding toward an outside of the first member in a manner curved from a periphery of the through hole, the edge portion surrounding the through hole, the second member including an upstream end portion located on an upstream side of the second flow path, the upstream end portion being joined to the hole-forming portion by welding so as to cover an outer-peripheral surface of the hole-forming portion, the upstream end portion including an end face formed such that an angle formed with the outer-peripheral surface of the hole-forming portion is an obtuse angle, the end face being exposed on the outside of the first member and the second member, and the second flow path being a flow path for the exhaust gas that has passed through the through hole and flowed in from the upstream end portion.

2. The exhaust component according to claim 1, wherein an inner-peripheral surface of the upstream end portion is formed so as to expand radially outward from a downstream side toward the upstream side of the second flow path.

3. The exhaust component according to claim 1, wherein the hole-forming portion is curved toward the outside of the first member at an angle greater than 0 degrees and less than or equal to 90 degrees.

4. The exhaust component according to claim 1, wherein the first member is formed as a case including a catalyst therein, and wherein the second member is formed as a pipe to be connected to a sensor or an exhaust gas recirculation (EGR) pipe.

5. The exhaust component according to claim 1, wherein the hole-forming portion has a constant thickness and is formed so that an inner diameter of the through hole decreases continuously toward the outside of the first member, and wherein an inner surface of the hole-forming portion, corresponding to a portion where the first flow path and the through hole are connected to each other, is curved.

* * * * *